(12) United States Patent
Goodman et al.

(10) Patent No.: US 12,183,371 B1
(45) Date of Patent: Dec. 31, 2024

(54) ELECTRONIC DEVICE THAT INCLUDES A GAS PHASE COMPONENT

(71) Applicant: Seagate Technology LLC, Fremont, CA (US)

(72) Inventors: Rory Stephan Goodman, Boulder, CO (US); Yuhang Cheng, Edina, MN (US); Dipeshkumar Jayantilal Purani, Shakopee, MN (US); Silvia De Vito Luebben, Golden, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/701,977

(22) Filed: Mar. 23, 2022

(51) Int. Cl.
 *G11B 33/14* (2006.01)
 *B01D 53/26* (2006.01)

(52) U.S. Cl.
 CPC ........ *G11B 33/1453* (2013.01); *B01D 53/261* (2013.01); *G11B 33/1466* (2013.01); *G11B 33/1486* (2013.01); *B01D 2253/108* (2013.01)

(58) Field of Classification Search
 None
 See application file for complete search history.

(56) References Cited

U.S. PATENT DOCUMENTS

| | | | |
|---|---|---|---|
| 4,831,475 A | 5/1989 | Kakuda et al. | |
| 4,967,295 A | 10/1990 | Yamauchi et al. | |
| 5,075,807 A | 12/1991 | Inoue et al. | |
| 5,316,993 A | 5/1994 | Sextl et al. | |
| 7,478,760 B2 | 1/2009 | Beatty et al. | |
| 7,695,547 B2 | 4/2010 | Smith | |
| 8,254,055 B2 | 8/2012 | Brown | |
| 8,599,515 B2 | 12/2013 | Brown | |
| 8,693,135 B2 | 4/2014 | Brown | |
| 8,867,164 B2 | 10/2014 | Brown | |
| 8,885,287 B1 | 11/2014 | Koike et al. | |
| 9,230,608 B2 | 1/2016 | Ellison et al. | |

(Continued)

FOREIGN PATENT DOCUMENTS

| | | | | |
|---|---|---|---|---|
| CN | 102403016 A | | 4/2012 | |
| JP | 59033676 A | * | 2/1984 | ............. G11B 33/14 |

(Continued)

OTHER PUBLICATIONS

English-machine translation of Tamamushi et al. (JP 59-33676), published on Feb. 23, 1984 (Year: 1984).*

(Continued)

*Primary Examiner* — William J Klimowicz
(74) *Attorney, Agent, or Firm* — Kagan Binder, PLLC

(57) ABSTRACT

An electronic device including a housing having an interior gas space, at least one electronic component positioned within the housing, an environmental control module positioned within the housing, wherein the environmental control module contains a sorbent, and a relative humidity sensor in communication with the interior gas space, wherein the interior gas space is maintainable at a relative humidity of 0% as measured by the relative humidity sensor. The interior gas space may include between about 97% and about 99.9% helium expressed as a molar fraction and at least a portion of the remainder as molecular oxygen. The sorbent can include at least one of a type A zeolite, a type X zeolite, or a type Y zeolite.

8 Claims, 2 Drawing Sheets

(56) References Cited

U.S. PATENT DOCUMENTS

| | | | |
|---|---|---|---|
| 9,302,795 B1* | 4/2016 | Beatty | B65B 25/002 |
| 10,115,436 B1 | 10/2018 | Zhang et al. | |
| 10,276,216 B2 | 4/2019 | Zhang et al. | |
| 10,388,328 B1 | 8/2019 | Tan et al. | |
| 10,468,071 B1 | 11/2019 | Tasaka et al. | |
| 10,566,031 B2 | 2/2020 | Brand | |
| 10,593,372 B2 | 3/2020 | Yap et al. | |
| 10,641,551 B2 | 5/2020 | Van Asbrouck | |
| 10,734,035 B1* | 8/2020 | Sun | G11B 33/1453 |
| 11,024,343 B2 | 6/2021 | Luebben et al. | |
| 11,065,713 B1* | 7/2021 | Lapp | G11B 33/148 |
| 11,270,739 B1* | 3/2022 | Zhang | G11B 33/1453 |
| 11,355,161 B2 | 6/2022 | Luebben et al. | |
| 11,567,834 B2 | 1/2023 | Bent et al. | |
| 11,631,436 B1* | 4/2023 | Luebben | G11B 33/1453 |
| | | | 360/97.12 |
| 11,725,148 B2 | 8/2023 | Romaniuk et al. | |
| 2004/0095668 A1* | 5/2004 | Feliss | G11B 5/012 |
| | | | 360/75 |
| 2007/0253086 A1* | 11/2007 | Schmidt | G11B 33/14 |
| | | | 360/69 |
| 2007/0279795 A1* | 12/2007 | Strom | G11B 33/1453 |
| 2008/0180835 A1* | 7/2008 | Strom | G11B 25/043 |
| 2009/0116141 A1 | 5/2009 | Brown | |
| 2009/0188386 A1 | 7/2009 | Beatty et al. | |
| 2010/0296191 A1 | 11/2010 | Kim et al. | |
| 2012/0039000 A1* | 2/2012 | Brown | G11B 25/043 |
| | | | 360/97.12 |
| 2014/0377143 A1 | 12/2014 | Ellison et al. | |
| 2021/0043232 A1* | 2/2021 | Luebben | H05K 5/0217 |
| 2021/0043233 A1* | 2/2021 | Luebben | H05K 5/0217 |
| 2022/0148626 A1* | 5/2022 | Luebben | H05B 3/06 |
| 2022/0406341 A1* | 12/2022 | Luebben | H05K 5/0217 |

FOREIGN PATENT DOCUMENTS

| | | |
|---|---|---|
| JP | 2012120953 A | 6/2012 |
| JP | 2018130719 A | 8/2018 |
| JP | 2021034083 A | 3/2021 |

OTHER PUBLICATIONS

Desiccant Air-Conditioner Adsorption Heat Pump, Mitsubishi Plastics, Inc. (In Japan), Published May 2010, (4 pages).

Zeolite Y, Zeolyst International, retrieved from 'https://www.zeolyst.com/our-products/standard-zeolite-powders/leolite-y.html', on Nov. 16, 2021, (6 pages).

"Molecular Sieve: Purpose, Origin, How It Is Made, Types, and Uses," Team Xometry, Published Feb. 8, 2024, retrieved from 'https://www.xometry.com/resources/materials/molecular-sieve/', (19 pages).

Amaral, "Inside Chemistry—Absorption vs Adsorption," Adsorption Dehumidifiers, 2023, retrieved from 'https://www.cotes.com/blog/acronyms-for-battery-manufacturing-industry-professionals', (7 pages).

"How Molecular Sieves Work," SSE Enterprise Search, Jul. 6, 2023, retreived from 'https://sse.co.th/how-molecular-sieves-work/#,' (10 pages).

Mohan et al., "Basics of Clay Minerals and Their Characteristic Properties," Clay and Clay Minerals, Jun. 24, 2021, (23 pages).

"Silica Gel Type C—Macro Pore," International Silica Gel Co., Ltd., retreived from https://www.isgco.cn/product/60.html, on Jun. 13, 2024, (2 pages).

"Palygorskite," , Virtual Museum of Minerals and Molecules, University of Wisconsin Madisen, retreived from https://virtual-museum.soils.wisc.edu/display/palygorskite/, on Jun. 13, 2024, (3 pages).

Sing et al., "Reporting Physisorption Data for Gas/Solid Systems with Special Reference to the Determination of Surface Area and Porosity," Pure & Applied Chemistry, vol. 57, No. 4, pp. 603-619, 1985, (17 pages).

Canivet et al., "Water adsorption in MOFs: Fundamentals and applications," Chemical Society Reviews, 43(16), pp. 5594-5617, (25 pages). May 2024.

"Dynamic vapor sorption," Wikipedia The Free Encyclopedia, retreived from 'https://en.wikipedia.org/wiki/Dynamic_vapor_sorption,' on May 21, 2024, (5 pages).

"Moisture sorption analysis of aspirin," Isochema Laboratory, Hiden Isochema Ltd, Application Note 120, Apr. 19, 2016, (2 pages).

"DVS measurement of water vapour sorption by Pine wood," Isochema Laboratory, Hiden Isochema Ltd, Application Note 127, Apr. 19, 2016, (3 pages).

Li et al., "Effects of pore sizes of porous silica gels on desorption activation energy of water vapour," Applied Thermal Engineering, vol. 27, Issues 5-6, pp. 869-876, Apr. 2007.

Gao, et al., "Removal of phthalate esters from drinking water with zeolite filter column", Journal of Civil, Architectrual & D Environmental Engineering, vol. 31, No. 6, Dec. 2009, 4 pp.

Mechanisms of Filtration, Air Quality Engineering, retrieved from https://www.air-quality-eng.com/air-cleaners/ D filtration-mechanisms/ on Apr. 16, 2023, 3 pp.

Molecular sieve, Wikipedia, retrieved from https://en.wikipedia.org/wiki/Molecular_sieve, on Nov. 2, 2022, 8 pp.

Molecular Sieve Adsorbents, from BASF, retrieved from www.catalysts.basf.com/adsorbents, Sep. 2015, 8 pp.

Unpublished U.S. Appl. No. 18/436,747, filed Feb. 8, 2024 (Not attached).

Unpublished U.S. Appl. No. 18/747,717, filed Jun. 19, 2024 (Not attached).

* cited by examiner

ELECTRONIC DEVICE THAT INCLUDES A GAS PHASE COMPONENT

BACKGROUND

The present disclosure relates to electronic devices such as data storage devices including internal and/or external hard disk drives (HDDs), network attached storage (NAS), and the like, and more particularly relates to improving the operational lifetime of such data storage devices and maintaining the condition of internal, electronic drive components for the service life of the electronic device.

SUMMARY

It can be beneficial for a wide variety of electronic devices having an interior space and one or more electronic components located within the interior space to have an atmosphere that is particularly designed to provide improved performance. Further, there is a need to maintain internal, electronic drive components in as-built conditions for the service life of the electronic device, thereby reducing the rate of device failure. The methods and devices herein provide for desirable ranges for the composition of the gas phase internal to electronic devices.

A wide variety of electronic devices having an interior space and one or more electronic components disposed within the interior space can benefit by having a container with a tightly controlled interior environment. In embodiments, an electronic device can include a data storage device. Non-limiting examples of data storage devices include hard disk drives (internal and/or external), network attached storage (NAS), and the like. Examples of hard disk drives are provided in U.S. Pat. No. 7,478,760 (Beatty et al.) and U.S. Pat. No. 7,695,547 (Smith), the entireties of which are incorporated herein by reference. In embodiments, an electronic device can include a hermetically sealed electronic device, which can be defined by the amount of gas that leaks from the electronic device after it has been sealed, for example, such as in a welded HDD. In embodiments, the HDD can include a Heat Assisted Magnetic Recording (HAMR) device.

In aspects described herein, an electronic device includes a housing having an interior gas space, at least one electronic component positioned within the housing, an environmental control module positioned within the housing, wherein the environmental control module contains a sorbent, and a relative humidity sensor in communication with the interior gas space, wherein the interior gas space is maintainable at a relative humidity of 0% as measured by the relative humidity sensor. The sorbent can include at least one of a type A zeolite, a type X zeolite, and a type Y zeolite. The sorbent may include at least 800 mg of a zeolite, at least 1200 mg of a zeolite, and at least 1800 mg of a zeolite.

The interior gas space can include a composition of helium of 99.9% or less expressed as a molar fraction and molecular oxygen in an amount between 0.1% and 3%. The interior gas space can include between about 97% and about 99.9% of helium expressed as molar fraction and a remainder as molecular oxygen, and can include between about 99% and about 99.9% expressed as molar fraction of helium and a remainder as molecular oxygen. In embodiments, the composition may alternatively or additionally include other gas impurities, such as nitrogen, carbon dioxide, argon, and/or combinations of these and/or other gas impurities, for example. The housing may be a disk drive housing and the at least one electronic component may include disk drive components.

In other aspects described herein, a method of assembling an electronic device includes the steps of positioning an environmental control module comprising a sorbent within an interior housing space of the electronic device, closing the interior housing space with a cover comprising a gasket with a low helium leak rate and a low vapor water transmission rate, filling the interior housing space with an initial gas fill having a composition comprising helium of 99.9% or less expressed as molar fraction and a remainder as molecular oxygen (and/or other gas impurities), and waiting for components within the interior housing space to desorb water and the internal atmosphere of the interior housing space to reach equilibrium while measuring a relative humidity by a relative humidity sensor until the relative humidity reaches 0%.

The method may further include a step of monitoring an oxygen level within the interior housing space and providing oxygen to the interior housing space with an oxygen generating device. The sorbent used in the method may include at least one of a type A zeolite, a type X zeolite, and a type Y zeolite. The sorbent may include at least 800 mg of a zeolite.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Hard disk drives are desirably provided with an internal atmosphere of specific composition to achieve certain performance characteristics. The target composition may be introduced in the internal space as an initial fill of a gas mixture. The initial fill gas mixture can include primarily helium gas and a second minor gas fraction consisting of oxygen. The purpose of the primarily helium environment is to reduce gas turbulence induced vibration of the drives internal components to facilitate track follow capability across sub 100 nm track widths. The oxygen gas is present to oxidize metallic, inorganic and organic surfaces as desired (e.g., to maintain the components as-built conditions). The total gas pressure inside the sealed hard disk drive may be equal or lower to atmospheric pressure and preferably between 600 and 1013 mBar.

The present disclosure is directed to hard disk drives (HDD) including heat assisted magnetic recording devices (e.g., HAMR devices) that are provided with an interior area having an internal environment that includes a range of gas composition that provides for improved, sustained performance. In embodiments, the composition includes: a relative humidity of 0% as determined by the reading of an internal relative humidity sensor of the hard disk drive at all operating temperatures; and an oxygen molar concentration that is relatively low but is at least slightly above zero, such as equal to or higher than 0.1%, but less than 3%. The favorable results achieved by providing disk drives with such internal environments is unexpected in view of the internal environments reported in the art. For example, U.S. Pat. No. 10,468,071 (Tasake et al), the contents of which are incorporated herein by reference, discusses gas compositions for hard disk drives that include oxygen levels greater than or equal to 10% with a relative humidity of less than 5%, oxygen levels of greater than or equal to 3% with a relative humidity of less than 5%, and oxygen levels of greater than or equal to 3% with a relative humidity of less than 1%.

Figure 1:
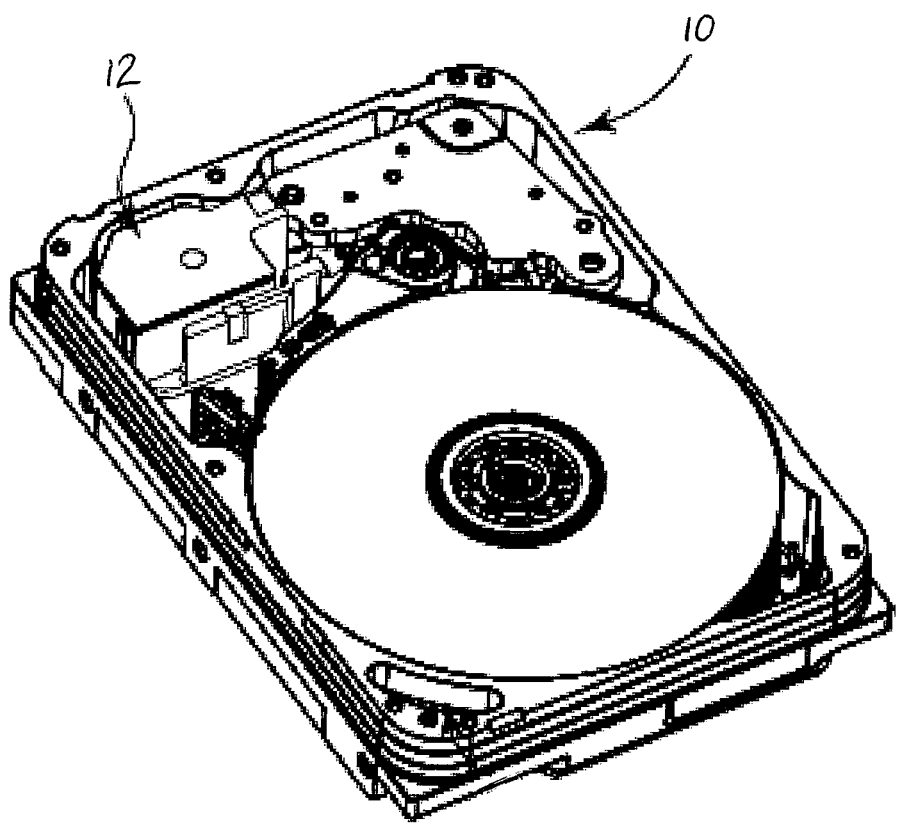
FIG. 1 is a perspective view of an interior area of a disk drive that can maintain a desired internal atmosphere when it includes a cover and is in a closed and sealed configuration.

Referring now to FIG. 1, a perspective view is provided of an interior area of a disk drive 10 that can maintain a desired internal atmosphere, as described above, when in its closed and sealed configuration. Disk drive 10 includes an environmental control module 12 that can contain a sorbent used for drying gases and solvents, which is used to provide a desired relative humidity within the interior area. Such sorbents can include either a type A zeolite, a type X zeolite, or a type Y zeolite, for example, but may instead include different or additional sorbents. The illustrated location and configuration of the module 12 is only intended to be exemplary, as it is contemplated that the environmental control module may have a wide variety of configurations and be positioned in a different location within the disk drive 10. It is further contemplated that more than one environmental control module can be included in the disk drive 10.

In order to measure the relative humidity of the interior area of the disk drive 10, one or more relative humidity sensors can be provided. Exemplary sensors may include the ALPS Alpine HSHCAL001B relative humidity sensor that is commercially available from ALPS Alpine Co. Ltd. of Ota City, Tokyo, Japan, and the Sensirion SHTC1-CSE-03 and Sht4x relative humidity sensors0 that are commercially available from Sensirion AG of Stafa, Switzerland.

Figure 2:
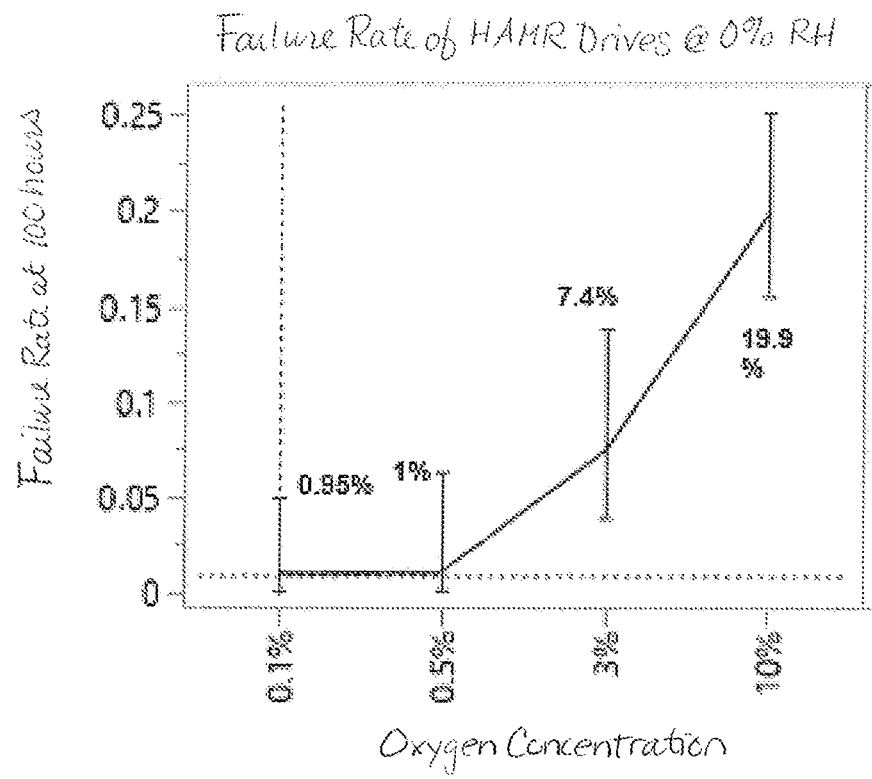
FIG. 2 is a graphical representation of the failure rate of a heat assisted magnetic recording device at 0% relative humidity as measured by a relative humidity sensor.

FIG. 2 is a graphical representation of the failure rate of a heat assisted magnetic recording device at 0% relative humidity as measured by a relative humidity sensor. As shown, the cumulative failure rate of tested HAMR devices having relative humidity equal to 0% (as measured by a relative humidity sensor) is maintained at a low level as oxygen concentration is in a range of 0.1% to 0.5%, but can be as high as about 3%. The failure rate increases when the concentration of oxygen in the gas phase increases to 3%, and the failure rate increases even more when the concentration of oxygen in the gas phase increases to 10%.

Figure 3:
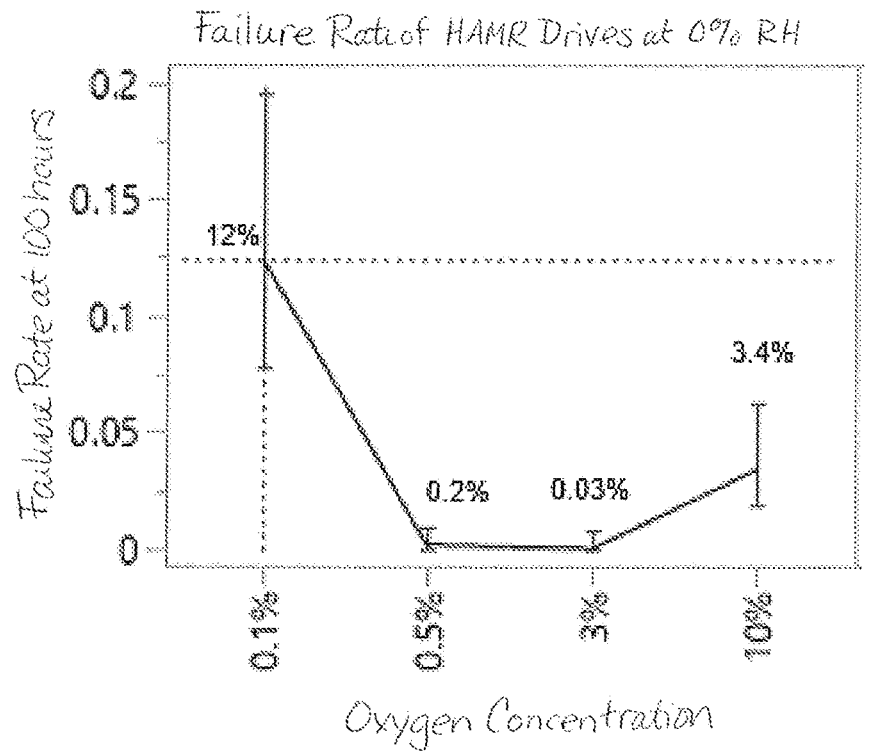
FIG. 3 is a graphical representation of the failure rate of a heat assisted magnetic recording device at 0% relative humidity as measured by a relative humidity sensor.

FIG. 3 is a graphical representation of the failure rate of a heat assisted magnetic recording device at 0% relative humidity as measured by a relative humidity sensor, using a different head design than used in FIG. 2. While the test of this head design showed a higher failure rate at 0.1% oxygen concentration, the test at 0.5% oxygen concentration was similar to that achieved with the head design of FIG. 2. Again, the failure rate increases when the concentration of oxygen in the gas phase increases to 10%.

A combination of the information provided in FIGS. 2 and 3 illustrate that there is a desirable oxygen concentration range to achieve a low cumulative failure rate that depends on the particular head design. In any case, the oxygen concentration is above 0.1% and equal to or less than 3%, as expressed by gas molar fraction when the relative humidity is 0%.

A number of methods can be used to assemble a disk drive that provide an internal atmosphere as discussed herein. One exemplary method includes selecting an environmental control module that is positionable within the internal space of a disk drive. An exemplary environmental control module can contain a sorbent used for drying gases and solvents, wherein such sorbents can include at least one of a type A zeolite, a type X zeolite, or a type Y zeolite.

Zeolites that can be used in accordance with devices and methods described herein are also known as molecular sieves. These zeolites are crystalline materials primarily made up of $SiO_4$ and $AlO_4$ corner-sharing tetrahedral building units. They contain a three-dimensional network of pores of regular size that is used for the selective absorption of chemical species. All types of zeolites are contemplated for use with the devices and methods described herein, wherein exemplary zeolites include the 3 A molecular sieve (2/3 $K_2O \cdot 1/3$ $Na_2O \cdot Al_2O_3 \cdot 2$ $SiO_2 \cdot 9/2$ $H_2O$), the 4 A type sieve ($Na_2O \cdot Al_2O_3 \cdot 2$ $SiO_2 \cdot 9/2$ $H_2O$, the 5 A type sieve (3/4 $CaO \cdot 1/4$ $Na_2O \cdot Al_2O_3 \cdot 2$ $SiO_2 \cdot 9/2$ $H_2O$), and the 13X sieve that is formed by $Na_2O \cdot Al_2O_3 \cdot (2.8 \pm 0.2)SiO_2 \cdot (6-7)$ $H_2O$.

Zeolite X and zeolite Y belong to the family of aluminosilicate molecular sieves with a faujasite-type structure (FAU). It is characterized by the formula |(Ca, Mg, $Na_2)_{29}$ $(H_2O)_{240}|[Al_{58}Si_{134}O_{384}]$-FAU (International zeolite association (IZA)).

Zeolites used in accordance with devices and methods described herein can be provided in a number of formats, depending on the configuration and positioning of the environmental control module in which the zeolites will be located. Exemplary formats include powder, pressed spheres, or pellets. In other embodiments, zeolites can be pressed together with a binder to form one or more tablets, spheres, pellets, and the like. In exemplary embodiments, the environmental control module contains a minimum of 800 mg of either a type A zeolite, a type X zeolite, or a type Y zeolite but can include more than 1200 mg of either a type A zeolite, a type X zeolite, or a type Y zeolite, and can even include more than 1800 mg of either a type A zeolite, a type X zeolite, or a type Y zeolite.

After the environmental control module is positioned within the interior area of a disk drive, the drive is closed with a cover to create an enclosed space in the drive. To provide a desirable seal, the cover includes a gasket that may be formed in place, for example. The gasket can have a low helium leak rate and low vapor water transmission rate. The enclosed internal space is then filled with an initial gas fill that has a composition of helium between 97% and 99.9% expressed as molar fraction. The remainder of the gas fill can be molecular oxygen, or the composition may alternatively or additionally include other gas impurities, such as nitrogen, carbon dioxide, argon, and/or combinations of these and/or other gas impurities, for example.

A period of time is then allowed to elapse so that the components within the enclosed internal space of the disk drive can desorb water. In an exemplary embodiment, time that elapses will be the time for the internal atmosphere of the enclosed space to reach equilibrium and for a relative humidity sensor to reach 0%. In embodiments, the amount of time that elapses can be approximately 10 hours, for example, although shorter or longer time periods are contemplated.

In another exemplary method used to achieve and maintain the target atmosphere inside the drive enclosure, an environmental control module is selected that is positionable within the internal space of a disk drive. An exemplary environmental control module can contain sorbents such as a type A zeolite, a type X zeolite, or a type Y zeolite. In exemplary embodiments, the environmental control module contains a minimum of 800 mg of either a type A zeolite, a type X zeolite, or a type Y zeolite, but can include more than 1200 mg of either a type A zeolite, a type X zeolite, or a type Y zeolite, and can even include more than 1800 mg of either a type A zeolite, a type X zeolite, or a type Y zeolite. Other possible exemplary zeolites that can be utilized are described above and are equally applicable to the various exemplary devices and methods provided herein.

After the environmental control module is positioned within the interior area of a disk drive, the drive is closed with a cover to create an enclosed space in the drive. To provide a desirable seal, the cover includes a gasket that may be formed in place, for example. The gasket can have a low helium leak rate and low vapor water transmission rate. The enclosed internal space is then filled with an initial gas fill that has a composition of helium between 97% and 99.9% expressed as molar fraction. The remainder of the gas fill will be molecular oxygen, or the composition may alternatively or additionally include other gas impurities, such as nitrogen, carbon dioxide, argon, and/or combinations of these and/or other gas impurities, for example.

A period of time is then allowed to elapse so that the components within the enclosed internal space of the disk drive can desorb water. In an exemplary embodiment, time that elapses will be the time for the internal atmosphere of the enclosed space to reach equilibrium and for a relative humidity sensor to reach 0%. In embodiments, the amount of time that elapses can be a minimum of approximately 1 hour, for example, although shorter or longer time periods (e.g., 50 hours, 70 hours, or longer) are contemplated.

With this method, the interior area of the disk drive can include an oxygen generating device in order to counteract a decrease in the concentration of oxygen contained in sealed HDDs that can occur over time. The rate of decrease of oxygen concentration can depend on a variety of factors such as one or more drive operating conditions. The loss of oxygen over time can be attributed to chemical reactions between oxygen and internal drive components. Such internal drive components include, but are not limited to, the recording media, activated carbon, and ferrous metal components. The measured rate of loss of oxygen can result in the oxygen concentration dropping below a desired concentration over the service life of the HDD. Oxygen generating devices that can be used for this purpose are described in U.S. Pat. No. 11,023,343, the entire contents of which are incorporated herein by reference.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. An electronic device comprising:
 a housing having an interior gas space;
 at least one electronic component positioned within the housing;
 an environmental control module positioned within the housing, wherein the environmental control module contains a sorbent configured to provide and maintain a desired relative humidity within the interior gas space; and
 a relative humidity sensor in communication with the interior gas space,
 wherein the interior gas space is maintained at a relative humidity of 0% at all operating temperatures of the electronic device, as measured by the relative humidity sensor; and
 wherein the interior gas space comprises a composition comprising helium of 99.9% or less expressed as a molar fraction and molecular oxygen in an amount between 0.1% and 3%.

2. The electronic device of claim 1, wherein the sorbent comprises at least one of a type A zeolite, a type X zeolite, and a type Y zeolite.

3. The electronic device of claim 1, wherein the sorbent comprises at least 800 mg of a zeolite.

4. The electronic device of claim 3, wherein the sorbent comprises at least 1200 mg of a zeolite.

5. The electronic device of claim 4, wherein the sorbent comprises at least 1800 mg of a zeolite.

6. The electronic device of claim 1, wherein the interior gas space comprises between about 97% and about 99.9% helium expressed as molar fraction and at least a portion of the remainder as molecular oxygen.

7. The electronic device of claim 6, wherein the interior gas space comprises between about 99% and about 99.9% helium expressed as molar fraction and at least a portion of the remainder as molecular oxygen.

8. The electronic device of claim 1, wherein the housing is a disk drive housing and wherein the at least one electronic component comprises disk drive components.

* * * * *